(12) United States Patent
Huang et al.

(10) Patent No.: US 9,769,718 B2
(45) Date of Patent: Sep. 19, 2017

(54) DRX PARAMETER CONFIGURATION METHOD AND ASSOCIATED BASE STATION FOR FACILITATING ANR MEASUREMENT

(71) Applicant: TELEFONAKTIEBOLAGET L M ERICSSON (PUBL), Stockholm (SE)

(72) Inventors: Min Huang, Beijing (CN); Tobias Tynderfeldt, Solna (SE); Lei Xiao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 100 days.

(21) Appl. No.: 14/442,143

(22) PCT Filed: Nov. 12, 2012

(86) PCT No.: PCT/CN2012/084453
§ 371 (c)(1),
(2) Date: May 12, 2015

(87) PCT Pub. No.: WO2014/071629
PCT Pub. Date: May 15, 2014

(65) Prior Publication Data
US 2015/0351151 A1    Dec. 3, 2015

(51) Int. Cl.
*H04W 24/02* (2009.01)
*H04W 24/04* (2009.01)
*H04W 76/04* (2009.01)
*H04W 36/00* (2009.01)
(Continued)

(52) U.S. Cl.
CPC ....... *H04W 36/0083* (2013.01); *H04W 24/08* (2013.01); *H04W 76/048* (2013.01); *H04W 84/042* (2013.01)

(58) Field of Classification Search
None
See application file for complete search history.

(56) References Cited

U.S. PATENT DOCUMENTS

2009/0285141 A1* 11/2009 Cai .................. H04W 52/0251
                                                              370/311
2010/0113023 A1* 5/2010 Huang ............... H04W 76/048
                                                              455/436
(Continued)

FOREIGN PATENT DOCUMENTS

CN    101039208 A    9/2007
CN    102036273 A    9/2009
(Continued)

OTHER PUBLICATIONS

PCT Notification of Transmittal of the International Search Report and the Written Opinion of the International Searching Authority, for Counterpart PCT Application No. PCT/CN2012/084453, dated Aug. 15, 2013, 10 pages.
(Continued)

*Primary Examiner* — Duc Duong
(74) *Attorney, Agent, or Firm* — NDWE LLP (57) ABSTRACT

The present invention discloses a Discontinuous Reception (DRX) parameter configuration method for facilitating Automatic Neighbor Relation (ANR) measurement. The method comprises determining a traffic intensity of a User Equipment (UE) by which a DRX-based ANR measurement is to be performed. The method further comprises setting a value for a DRX parameter to be used by the UE to perform the DRX-based ANR measurement, in accordance with the determined traffic intensity of the UE. The method further comprises transmitting the value set for the DRX parameter to the UE. The present invention further provides an associated BS adapted to perform DRX parameter configuration to facilitate ANR measurement.

18 Claims, 7 Drawing Sheets

(51) Int. Cl.
*H04W 24/08* (2009.01)
*H04W 84/04* (2009.01)

(56) References Cited

U.S. PATENT DOCUMENTS

| | | | |
|---|---|---|---|
| 2012/0051274 A1 | 3/2012 | Song | |
| 2012/0106370 A1* | 5/2012 | Radulescu | H04W 36/0083 370/252 |
| 2012/0120828 A1 | 5/2012 | Anderson et al. | |
| 2012/0207069 A1 | 8/2012 | Xu et al. | |
| 2012/0263088 A1 | 10/2012 | Terry et al. | |
| 2012/0275366 A1* | 11/2012 | Anderson | H04W 52/0219 370/311 |
| 2013/0183982 A1* | 7/2013 | Martin | H04W 36/0061 455/437 |
| 2014/0073306 A1* | 3/2014 | Shetty | H04W 36/0088 455/418 |
| 2014/0302865 A1* | 10/2014 | Bai | H04W 24/10 455/452.1 |
| 2015/0215830 A1* | 7/2015 | Dalsgaard | H04W 36/0094 455/444 |

FOREIGN PATENT DOCUMENTS

| | | |
|---|---|---|
| CN | 102761890 A | 10/2012 |
| CN | 102761897 A | 10/2012 |

OTHER PUBLICATIONS

3GPP TR 36.902 v9.3.1, "Evolved Universal Terrestrial Radio Access Network (E-UTRAN); Self-configuring and self-optimizing network (SON) use cases and solutions," <http://www.3gpp.org/DynaReport/36902.htm>, (Mar. 2011), 21 pages.
3GPP TS 36.133 v10.6.0, "Evolved Universal Terrestrial Radio Access (E-UTRA); Requirements for support of radio resource management," <http://www.3gpp.org/DynaReport/36133.htm>, LTE Technical Specification, (Mar. 2012), 568 pages.
3GPP TS 36.300 v10.6.0, ETSI TS 136 300 v10.6.0, "Evolved Universal Terrestrial Radio Access (E-UTRA) and Evolved Universal Terrestrial Radio Access Network (E-UTRAN); Overall description; Stage 2," LTE Technical Specification, <http://www.3gpp.org/DynaReport/36300.htm>, (Jan. 2012), 209 pages.
3GPP TS 36.321 v10.4.0, ETSI TS 136 321 v10.4.0, "Evolved Universal Terrestrial Radio Access (E-UTRA); Medium Access Control (MAC) protocol specification," LTE Technical Specification, <http://www.3gpp.org/DynaReport/36321.htm>, (Jan. 2012), 57 pages.
3GPP TS 36.331 v10.4.0, "Evolved Universal Terrestrial Radio Access (E-UTRA); Radio Resource Control (RRC); Protocol specification," LTE Technical Specification, <http://www.3gpp.org/DynaReport/36331.htm>, (Dec. 2011), 296 pages.
PCT Notification of Transmittal of International Preliminary Report on Patentability (Chapter I), for Counterpart PCT Application No. PCT/CN2012/084453, dated May 21, 2015, 6 pages.
Extended European Search Report, EP Application No. 12888032.5, dated Nov. 4, 2015, 9 pages.
"ANR Stage 3 TP," May 5-9, 2008, 23 pages, 3GPP TSG-RAN WG2 Meeting #62, R2-082877 & R2-082552, Ericsson, Nokia Corporation, Nokia Siemens Networks, T-Mobile Vodafone, Orange, Qualcomm Europe, Kansas City, USA.
"LTE Fast Dormancy," Nov. 15-19, 2010, 7 pages, 3GPP TSG-RAN WG2 Meeting #72, R2-106285, Intel Corporation, Jacksonville, Florida.

* cited by examiner

DRX PARAMETER CONFIGURATION METHOD AND ASSOCIATED BASE STATION FOR FACILITATING ANR MEASUREMENT

CROSS-REFERENCE TO RELATED APPLICATIONS

This application is a National stage of International Application No. PCT/CN2012/084453, filed Nov. 12, 2012, which is hereby incorporated by reference.

FIELD OF THE INVENTION

The present invention generally relates to Discontinuous Reception (DRX) parameter configuration, and particularly, to a DRX parameter configuration method and an associated base station (BS) for facilitating Automatic Neighbor Relation (ANR) measurement.

BACKGROUND OF THE INVENTION

To relieve the operator from the burden of manually managing Neighbor Relations (NRs) and even to construct a self-optimization network (SON), a technique called ANR has been proposed and applied in cellular communications systems. One of the fundamental requirements for implementing ANR is to uniquely identify each cell in a cellular communications system.

Although Physical Cell Identifiers (PCIs) may be used for cell identification, the total amount of PCIs in current cellular systems (e.g., 504, in LTE systems) is too limited to achieve unique identification of each cell in the system. When different neighbor cells apply the same PCI, it is impossible to distinguish them by PCI and confusion results. To avoid such confusion, in addition to a Physical Cell Identifier, a Cell Global Identifier (CGI) is used to describe an effective NR for a neighbor cell. The total amount of CGIs is about 256 million, which is large enough for each cell to be identified by a unique CGI.

Figure 1:
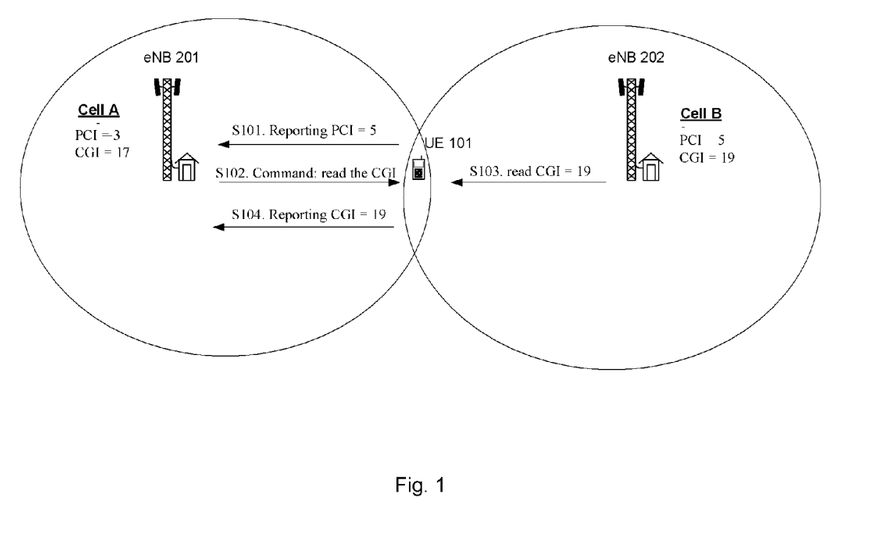
FIG. 1 is a diagram schematically illustrating steps of an example of ANR process performed in LTE systems and a scenario wherein the ANR process is to be performed.

In this regard, the ANR process requires ANR measurement procedure to successfully acquire CGI. An example of the ANR process in LTE systems is provided in [1] and will be described in the following by referring to FIG. 1. As illustrated in FIG. 1, a UE 101 currently located at the border between cell A and Cell B is served by an eNodeB (eNB) 201 and is able to measure the PCI of Cell B.

At the beginning of the ANR process, the UE 101 sends the measured PCI of Cell B to the eNB 201 (step S101). Upon receiving the measured PCI, the eNB 201 instructs the UE 101 to read the enhanced CGI (ECGI) of Cell B (step S102). In accordance with the instruction, the UE 101 receives System Information Block 1 (SIB1) from Cell B and reads the ECGI of Cell B contained in the SIB1 (step S103). Upon acquiring Cell B's ECGI, the UE 101 reports it to the eNB 201(step S104). Then, using the PCI and the ECGI of Cell B, the eNB 201 creates a new NR entry for Cell B in its NR list.

At step S103 of the above process, a continuous time gap shall be implemented, during which, instead of receiving data from Cell A, the UE 101 establishes synchronization with Cell B and maintains the synchronization to measure the ECGI.

Currently, to implement such a time gap, the 3$^{rd}$ Partnership Project (3GPP) organization proposes two alternative approaches: Discontinuous Reception (DRX) and autonomous gap. The DRX approach is described in [1] and [2], and the description about autonomous gap can be found in [1] and [3]. As the DRX approach is preferable to the autonomous gap approach in terms of implementation simplicity and backward-compatibility with legacy UEs and infrastructures, DRX-based ANR measurement should be applied in any phase of LTE networks.

The DRX functionality is standardized in LTE systems since Release 8. Though some other auxiliary parameters are used, the DRX functionality is mainly characterized by the three parameters as below:

On-Duration Timer, specifying an on-duration (in terms of time or in number of subframes) during which a UE waking up from DRX keeps awake to continuously attempt to receive and decode Physical Downlink Control Channels (PDCCHs). If the UE successfully decodes a PDCCH before the timer expires, it stays awake and starts a DRX Inactivity Timer.

DRX Inactivity Timer, specifying a duration (in terms of time or in number of subframes) during which the UE continuously attempts to receive and decode PDCCHs. If the UE fails to successfully decode a PDCCH until the timer expires, it re-enters into DRX. The UE shall restart the DRX Inactivity Timer following a successful decoding of a PDCCH for a first user data transmission only (i.e. not for retransmissions).

DRX Cycle, specifying the periodic repetition of the on-duration.

Figure 2:
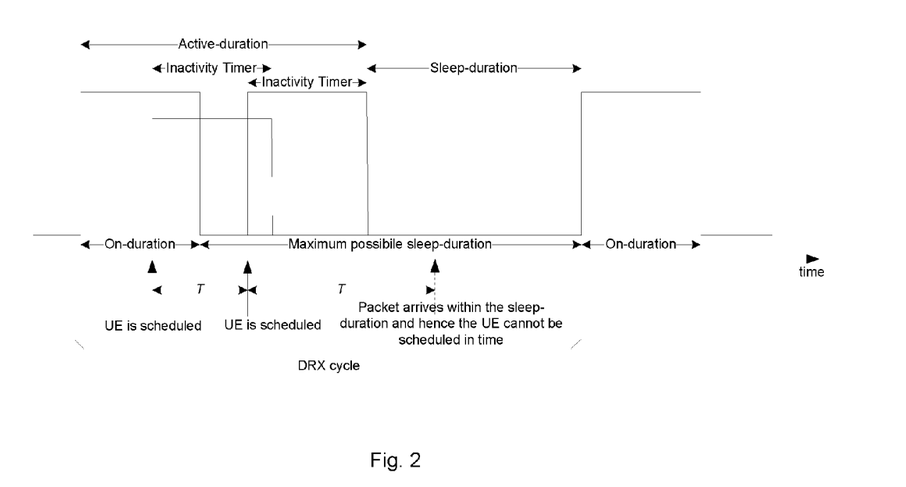
FIG. 2 is a timing chart schematically illustrating parameters relevant to the DRX functionality.

FIG. 2 illustrates the above three parameters. Moreover, as shown in FIG. 2, the total time duration when UE is awake to monitor PDCCH is called active-duration, and the result of DRX cycle minus active-duration is called sleep-duration. The active-duration includes not only the "on-duration" but also the time duration during which the DRX Inactivity Timer is running. Based on the above, the minimum active-duration is of length equal to on-duration, and the maximum is undefined (infinite). Correspondingly, the sleep duration ranges from DRX cycle minus on-duration to 0.

Since the DRX functionality is originally introduced for power saving at UE, fixed DRX parameters are dedicatedly set for UEs having relatively low traffic intensity in current implementation. However, in practical situation, a UE does not necessarily employ the DRX functionality only when it is of low traffic intensity. This is especially true when a UE having high traffic intensity is to perform DRX-based ANR measurement enabling its handover to an unknown neighbor cell.

If a UE having high traffic intensity follows the fixed DRX parameters dedicatedly set for UEs having low traffic intensity, the active duration of the UE will increase while the sleep duration left for the UE will be shorten. This adversely reduces the possibility for the UE moving towards an unknown neighbor cell to successfully perform the DRX-based ANR measurement procedure, which in turn impedes the UE's handover to the unknown neighbor cell and may cause undesirable connection dropping and service interruption.

SUMMARY OF THE INVENTION

An object of the present invention is to eliminate or at least alleviate the negative impact of the prior art traffic-independent DRX parameter configuration on the DRX-based ANR measurement procedure.

To achieve the object, according to a first aspect of the invention, there is provided a DRX parameter configuration method for facilitating ANR measurement, comprising: determining a traffic intensity of a User Equipment (UE) by which a DRX-based ANR measurement is to be performed; setting a value for a DRX parameter to be used by the UE to perform the DRX-based ANR measurement, in accordance with the determined traffic intensity of the UE; and transmitting the value set for the DRX parameter to the UE.

According to a second aspect of the invention, there is provided a BS adapted to perform DRX parameter configuration to facilitate ANR measurement, comprising: a traffic intensity determination unit configured to determine a traffic intensity of a UE by which a DRX-based ANR measurement is to be performed; a DRX parameter setting unit configured to set a value for a DRX parameter to be used by the UE to perform the DRX-based ANR measurement, in accordance with the determined traffic intensity of the UE; and a transmitting unit configured to transmit the value set for the DRX parameter to the UE.

An advantage of the proposed method and BS according to the first and second aspects of the invention is that the UE can perform the DRX-based ANR measurement by using a DRX parameter set to an appropriate value in accordance with the UE's traffic intensity, which leads to an improved performance of the ANR measurement.

According to a third aspect of the invention, there is provided a parameter configuration method for facilitating ANR measurement, comprising: identifying a traffic type of a UE by which a DRX-based ANR measurement is to be performed, according to which range of a predetermined set of numerical ranges a traffic intensity of the UE falls into; adjusting a DRX Inactivity Timer to be used by the UE to perform the DRX-based ANR measurement; and transmitting the adjusted DRX Inactivity Timer to the UE. The adjustment of the DRX Inactivity Timer comprises: for a group of UEs having the same identified traffic type in a cell, obtaining an ANR measurement failure rate based on a number of ANR measurements performed by the UEs and a number of failures of the ANR measurements, during a first monitoring period; reducing the DRX Inactivity Timer for the UEs of the identified traffic type after the first monitoring period, if the calculated ANR measurement failure rate is larger than a maximum acceptable ANR measurement failure rate or the maximum acceptable ANR measurement failure rate plus a first positive offset value; and increasing the DRX Inactivity Timer for the UEs of the identified traffic type after the first monitoring period, if the calculated ANR measurement failure rate is smaller than the maximum acceptable ANR measurement failure rate or the maximum acceptable ANR measurement failure rate minus a second positive offset value.

According to a fourth aspect of the invention, there is provided a BS adapted to perform DRX parameter configuration to facilitate ANR measurement, comprising: a traffic type identification unit configured to identify a traffic type of a UE by which a DRX-based ANR measurement is to be performed, according to which range of a predetermined set of numerical ranges a traffic intensity of the UE falls into; a UE-group level adjustment unit configured to adjust a DRX Inactivity Timer to be used by the UE to perform the DRX-based ANR measurement; and a transmitting unit configured to transmit the adjusted DRX Inactivity Timer to the UE. The UE-group level adjustment unit comprises: an ANR measurement failure rate calculator configured to obtain an ANR measurement failure rate based on a number of ANR measurements performed by a group of UEs having the same identified traffic type in a cell and a number of failures of the ANR measurements, during a first monitoring period; a DRX Inactivity Timer adjustor configured to reduce the DRX Inactivity Timer for the UEs of the identified traffic type after the first monitoring period, if the calculated ANR measurement failure rate is larger than a maximum acceptable ANR measurement failure rate or the maximum acceptable ANR measurement failure rate plus a first positive offset value; and increase the DRX Inactivity Timer for the UEs of the identified traffic type after the first monitoring period, if the calculated ANR measurement failure rate is smaller than the maximum acceptable ANR measurement failure rate or the maximum acceptable ANR measurement failure rate minus a second positive offset value.

An advantage of the proposed method and BS according to the third and fourth aspects of the invention is that a UE can perform the DRX-based ANR measurement by using a DRX Inactivity Timer adjusted to an appropriate value based on a comparison between the actual ANR measurement failure rate and the maximum acceptable ANR measurement failure rate, which leads to an improved performance of the ANR measurement.

BRIEF DESCRIPTION OF THE DRAWINGS

The above and other objects, features, and advantages of the present invention will become apparent from the following descriptions on embodiments of the present invention with reference to the drawings, in which.

DETAILED DESCRIPTION OF THE PREFERRED EMBODIMENTS

Hereinafter, the present invention is described with reference to embodiments shown in the attached drawings.

However, it is to be understood that those descriptions are just provided for illustrative purpose, rather than limiting the present invention. Further, in the following, descriptions of known structures and techniques are omitted so as not to unnecessarily obscure the concept of the present invention.

As will be appreciated by those skilled in the art, the present invention is not limited to be applied only when a handover is to be performed within a network using a single radio access technology, but can be applied to facilitate DRX-based ANR measurement when a handover is to be performed between networks using different radio access technologies, such as from LTE to UTRAN, from LTE to GERAN, and between LTE TDD and LTE FDD.

Figure 3:
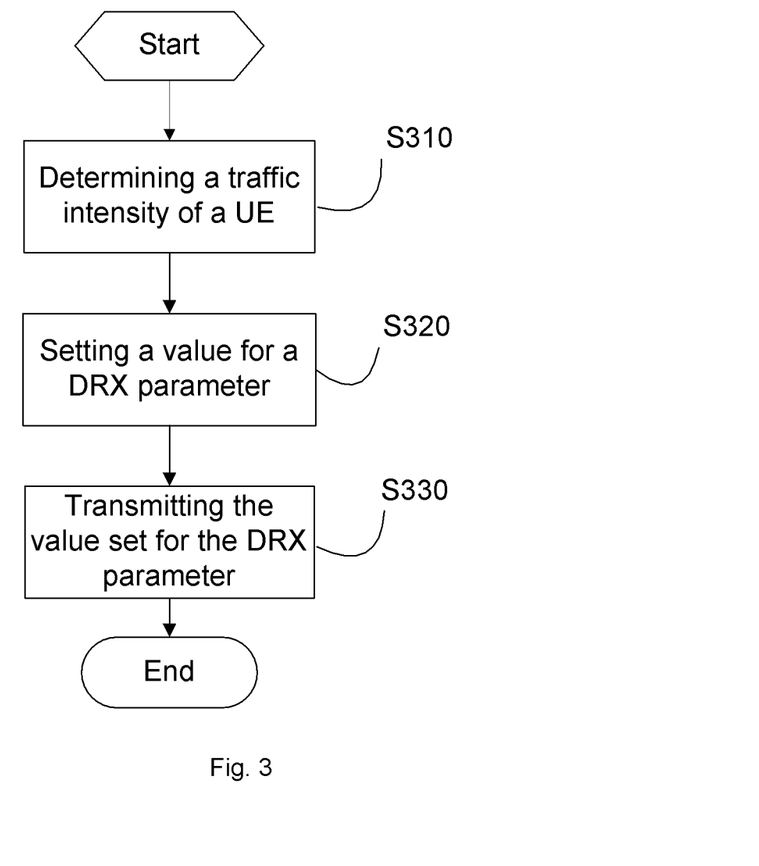
FIG. 3 is a flowchart schematically illustrating a DRX parameter configuration method for facilitating ANR measurement according to an embodiment of the present invention.

FIG. 3 illustrates a fundament method proposed by the present invention to perform DRX parameter configuration to facilitate ANR measurement. As illustrated, after a start of the proposed method, a traffic intensity of the UE by which a DRX-based ANR measurement is to be performed is determined (step S310). As will be further described in the following, the traffic intensity of the UE can be measured in terms of data rate of the UE, interval of data packets to the UE, arrival rate of data packets at the UE or any other measurable quantity by which the traffic intensity of the UE can be reflected. Then, based on the traffic intensity of the UE determined at step S310, a value is set for a DRX parameter to be used by the UE to perform the DRX-based ANR measurement (step S320) and is transmitted to the UE (step S330). After that, the example method of FIG. 3 ends. The DRX parameter may be DRX Cycle, On-Duration Timer and/or DRX Inactivity Timer.

A feasible manner to implement step S320 is to set a larger value for the DRX Cycle as the traffic intensity increases. In this manner, the maximum possible sleep duration determined by the result of the DRX Cycle minus the On-Duration Timer can be extended as the traffic intensity increases. Accordingly, the adverse increase in the length of active duration due to higher traffic intensity can be compensated for.

As another manner to implement step S320, the higher the traffic intensity is, the smaller value the On-Duration Timer is set to. In this manner, the maximum possible sleep duration determined by the result of the DRX Cycle minus the On-Duration Timer can also be extended to compensate for the adverse increase in the length of active duration due to higher traffic intensity.

A further manner is to set the DRX Inactivity Timer smaller as the traffic intensity increases. In this manner, the DRX Inactivity Timer is more likely to expire before subsequent traffic arrives at the UE. Accordingly, the adverse increase in the length of active duration due to higher traffic intensity can be avoided or compensated for. As will be appreciated by those skilled in the art, the above manners can be applied separately or in combination. In the following description, focus will be given on the setting and adjustment of the DRX Inactivity Timer in accordance with the traffic intensity, with the DRX Inactivity Timer and the On-Duration Timer respectively fixed to 256 ms and 10 ms which jointly produce a maximum possible sleep duration larger than a duration of 150 ms required for the ANR measurement.

For schematically illustrating the gain in ANR measurement success rate brought by setting the DRX Inactivity Timer in accordance with the traffic intensity, simulation is performed for the simulation parameter setting summarized in Table 1.

TABLE 1

| DRX parameter configuration | DRX Cycle | 256 ms |
|---|---|---|
| | On-Duration Timer | 10 ms |
| | DRX Inactivity Timer | 1-300 ms |
| Traffic intensity | interval of adjacent packets μ | [10, 20, 50, 100] ms |
| | average data rate R | [1000, 500, 200, 100] kbps |

As shown in Table 1, the lengths of DRX Cycle and On-Duration Timer are fixed to 256 ms and 10 ms, respectively. The length of DRX Inactivity Timer ranges from 1-300 ms.

For representative simplicity and without loss of generality, we assume the traffic packet arrival follows Poisson Flow model and each data packet has a fixed size of L=10 k bits. That is, the interval of two adjacent packets (denoted as T) satisfies exponential distribution, which is characterized by the following probability distribution function $$y = f(T \mid \mu) = \frac{1}{\mu} e^{-\frac{T}{\mu}}, T \geq 0,$$

where the expectation of the variable T equals the parameter μ. Typical values [10, 20, 50, 100] ms are selected for the parameter μ, which correspond to a set of values [1000, 500, 200, 100] kbps for the average data rate R=L/T=L/μ.

Figure 4:
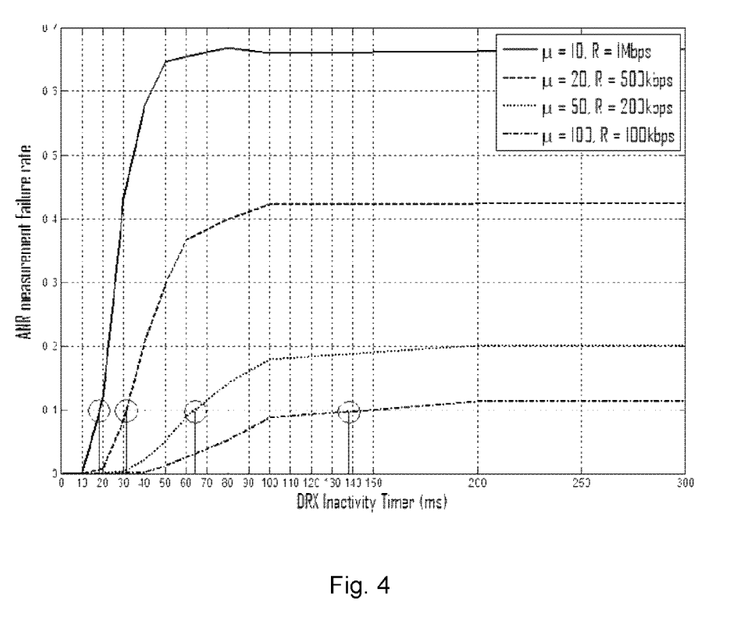
FIG. 4 is a graph schematically illustrating relationship between ANR measurement failure rate and DRX Inactivity Timer under different traffic intensities.

FIG. 4 illustrates the relationship between ANR measurement failure rate and DRX Inactivity Timer under different traffic intensities. The ANR measurement failure rate is obtained as the quotient of the number of ANR measurement failures divided by the number of DRX Cycles, with the number of ANR measurement failures incremented by 1 if the length of actual sleep duration in one DRX Cycle is smaller than 150 ms.

As can be seen from the curves plotted in FIG. 4, for a fixed DRX Inactivity Timer, the ANR measurement failure rate increases with the traffic intensity. For a certain traffic intensity, the ANR measurement failure rate declines (i.e., the ANR measurement success rate rises) as the DRX Inactivity Timer decreases. The ANR measurement failure rate can be accurately controlled by setting the DRX Inactivity Timer in accordance with the traffic intensity.

Figure 5:
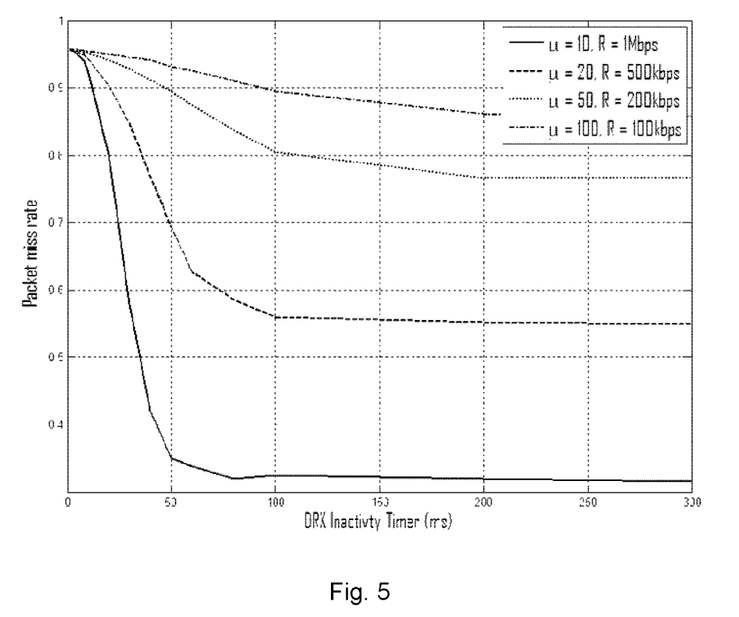
FIG. 5 is a graph schematically illustrating relationship between packet missing rate and DRX Inactivity Timer under different traffic intensities.

FIG. 5 illustrates the negative impact of the DRX Inactivity Timer on the traffic data transfer performance. The packet missing rate is obtained as the quotient of the number of missed packets divided by the total number of transmitted packets. A packet is missed if it arrives at the UE within the sleep duration.

As can be seen from the curves plotted in FIG. 5, for each of the traffic intensities, the packet missing rate gradually decreases with the DRX Inactivity Timer. In this regard, for better traffic data transfer performance, the DRX Inactivity Timer should be set as large as possible.

Referring back to FIG. 4, the largest possible DRX Inactivity Timer for a certain traffic intensity depends on the maximum acceptable ANR measurement failure rate. Therefore, to achieve a tradeoff between ANR measurement performance and traffic data transfer performance, it is preferable to set the DRX Inactivity Timer in accordance with the traffic intensity of the UE as well as the maximum acceptable ANR measurement failure rate. Given the simulation result as shown in FIG. 4 and supposing the maximum acceptable ANR measurement failure rate is 0.1, the DRX Inactivity Timer may be set to 18 ms, 32 ms, 64 ms and 136 ms respectively for the four traffic intensities characterized by R=[1000, 500, 200, 100] kbps.

To further reduce signaling overhead, the DRX Inactivity Timer can be set (quantified) to one of a predetermined set of values (e.g. [1, 2, 3, 4, 5, 6, 8, 10, 20, 30, 40, 50, 60, 80, 100, 200, 300] ms), which is the most close to but not larger than the value corresponding to the maximum acceptable ANR measurement failure rate in accordance with the traffic intensity of the UE.

Figure 6:
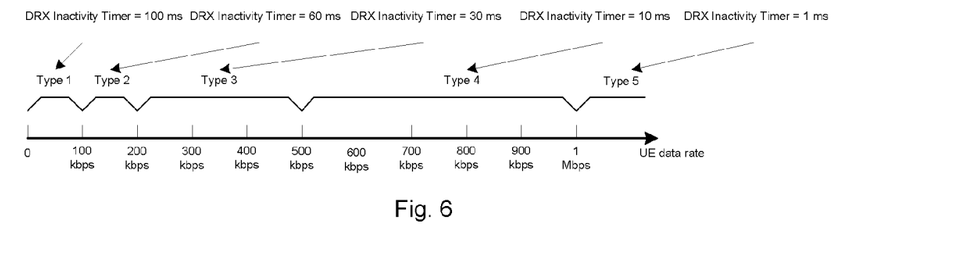
FIG. 6 is a diagram schematically illustrating example traffic types classified according to traffic intensity of a UE measured in terms of the UE's data rate.

In an alternative implementation, a traffic type of the UE is identified, according to which range of a predetermined set of numerical ranges the traffic intensity of the UE falls into. The DRX parameter is then set, in accordance with the identified traffic type. Note that the traffic type as used herein is determined by the traffic intensity range into which the traffic intensity of the UE falls, and different traffic types respectively correspond to different traffic intensity ranges. FIG. 6 illustrates an example of this implementation, wherein the DRX Inactivity Timer is set to 100 ms, 60 ms, 30 ms, 10 ms and 1 ms, respectively, in accordance with traffic types corresponding to data rate ranges of 0 to 100 kbps, 100 to 200 kbps, 200 to 500 kbps, 500 to 1000 kbps and 1000 to positive infinite kbps.

The values originally set for DRX parameters can be obtained through theoretical calculation or model simulation or can be derived from experience. However, partially because of the difference between the practical situation and the theoretical analysis and partially because of the network environment timing variance, the UE's capability and the cost of ANR measurement might change, and hence the values originally set for DRX parameters might become improper or obsolete.

To overcome this shortcoming, a UE-group level adjustment and/or a UE level adjustment for the DRX parameters may be performed after executing the fundamental DRX parameter configuration method described with reference to FIG. 3. The UE-group level adjustment is commonly applied for a group of UEs belonging to the same traffic type, while the UE level adjustment is individually applied for each UE.

Figure 7:
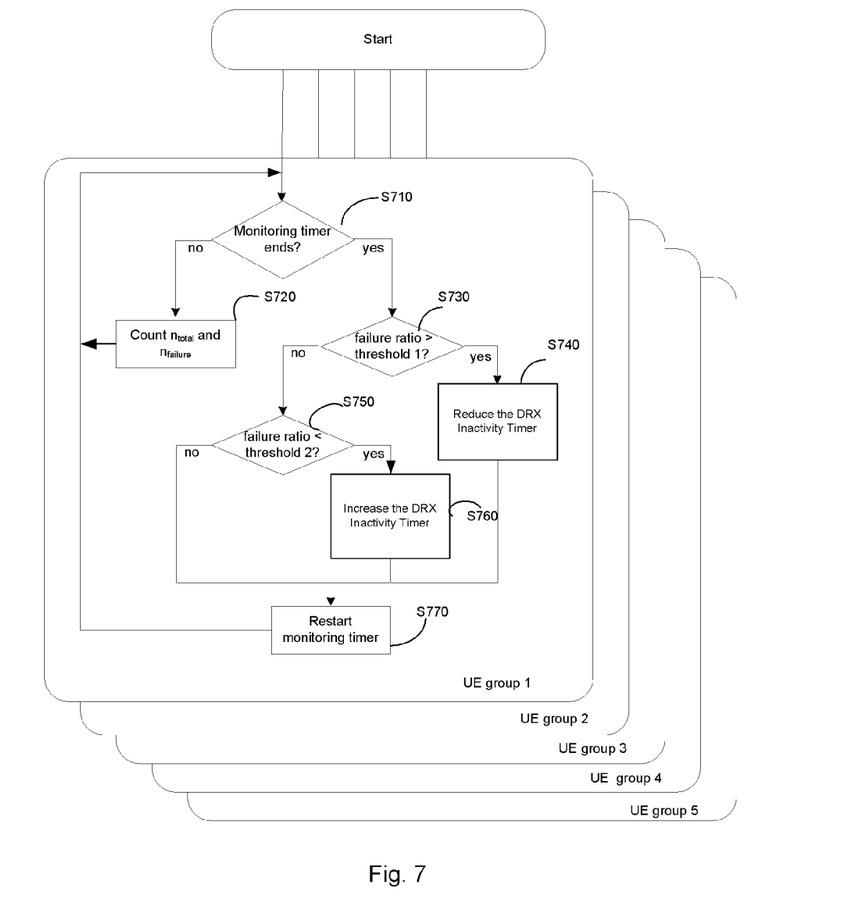
FIG. 7 is a flowchart schematically illustrating one exemplified implementation of the UE-group level adjustment according to the present invention.

FIG. 7 schematically illustrates one exemplified implementation of the UE-group level adjustment according to the present invention. As illustrated, after a start of the adjustment, the ANR measurement failure rate is evaluated for a group of UEs in a cell, by using a periodic monitoring timer. During the running of this timer ('No' in step S710), the number of failures of the ANR measurement (denoted as $n_{failure}$) and the total number of ANR measurements (denoted as $n_{total}$) are counted for the UEs (step S720). Every time the timer expires ('Yes' in step S710), the ANR measurement failure rate $n_{failure}/n_{total}$ is calculated. If the ANR measurement failure rate is larger than a first threshold ('Yes' in step S730), the DRX Inactivity Timer is reduced (step S740); on the opposite ('No' in step S730), if the ANR measurement failure rate is smaller than a second threshold ('Yes' in step S750), the DRX Inactivity Timer is increased (step S760). The monitoring timer is started periodically, e.g., every 2 hours (step S770).

Both the first threshold and the second threshold may be set to the maximum acceptable ANR measurement failure rate. However, to avoid ping-pong behavior of the UE-group level adjustment, it is preferable to set the first threshold as the maximum acceptable ANR measurement failure rate plus a positive offset value and/or to set the second threshold as the maximum acceptable ANR measurement failure rate minus a positive offset value. Moreover, if the DRX Inactivity Timer can be only adjusted to one of a predetermined set of values, the DRX Inactivity Timer is changed to the next larger enumerated value at step S760, and is changed to the next smaller enumerated value at step S740.

As will be appreciated by those skilled in the art, the desired ANR measurement performance can be achieved solely through the UE-group level adjustment, regardless of whether the DRX parameters are originally set in accordance with the traffic intensity of the UE.

Considering the ANR measurement failure might result from a variety of factors, it would be beneficial to further require that the UE reports the ANR measurement failure cause along with the existing measurement results. The specific cause could include "insufficient sleep duration". This requirement is optional and would lead to 3GPP specification modification on Uu interface RRC layer.

From the perspective of a single UE which is to take ANR measurement, the DRX parameter configuration produced as a result of setting the DRX parameters in according with the traffic intensity of the UE and/or performing the UE-group level adjustment should be set as the default DRX parameter configuration on which the UE level adjustment is to be performed. During the monitoring period for the UE level adjustment, if a UE experiences more than a predetermined number of ANR measurement failures, the eNB at the serving cell could adjust the DRX configuration (such as to decrease the DRX Inactivity Timer) for the UE individually, so as to timely provide sufficient sleep duration for reading CGI from a target cell undetected before. This can help the UE to avoid connection dropping and to improve handover performance when it is moving towards to the target cell. This kind of UE level adjustment can be continued until either the ANR measurement is successfully performed or the UE moves out of the border of its serving cell.

Figure 8:
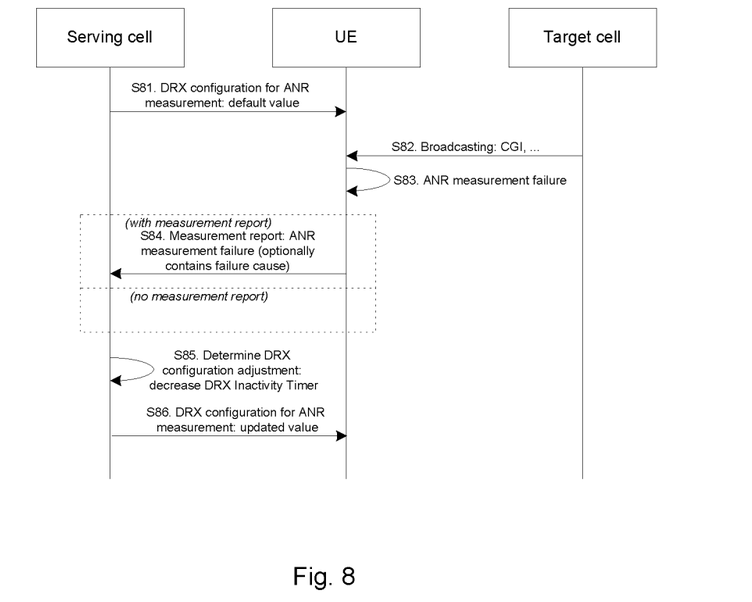
FIG. 8 is a signaling diagram schematically illustrating signaling exchange during a UE level adjustment according to the present invention.

FIG. 8 shows an exemplified signaling exchange among a UE, its serving cell and its target cell during the UE level adjustment. At the beginning, the serving cell provides the UE with a default DRX parameter configuration for ANR measurement (S81). The UE reads the broadcasting information from the target neighbor cell in the sleep duration, trying to obtain the target cell's CGI and other necessary information (S82). But due to insufficient length of sleep duration, this measurement fails (S83). The UE reports the ANR measurement failure to the serving cell in form of measurement report, which optionally contains the cause of failure (S84). Alternatively, the UE doesn't send any report. According to the reported ANR measurement failure from the UE or the UE's not sending any report, the eNB at the serving cell determines to reconfigure the UE with updated DRX parameters, such as with a decreased DRX Inactivity Timer, and provides the UE with the updated DRX parameters for the following ANR measurement (S85 and S86).

With regard to the DRX parameter configuration for ANR measurement, the UE-group level adjustment could be regarded as a slow operation, and the UE level adjustment could be regarded as a fast operation. The slow operation normally relies on a long monitoring period, like several hours, and is commonly applied to a group of UEs; while the fast operation is normally performed once every few ANR measurements, relies on a relatively shorter monitoring period, like several seconds, and is individually applied to a single UE. These two kinds of operations can be activated concurrently.

Figure 9:
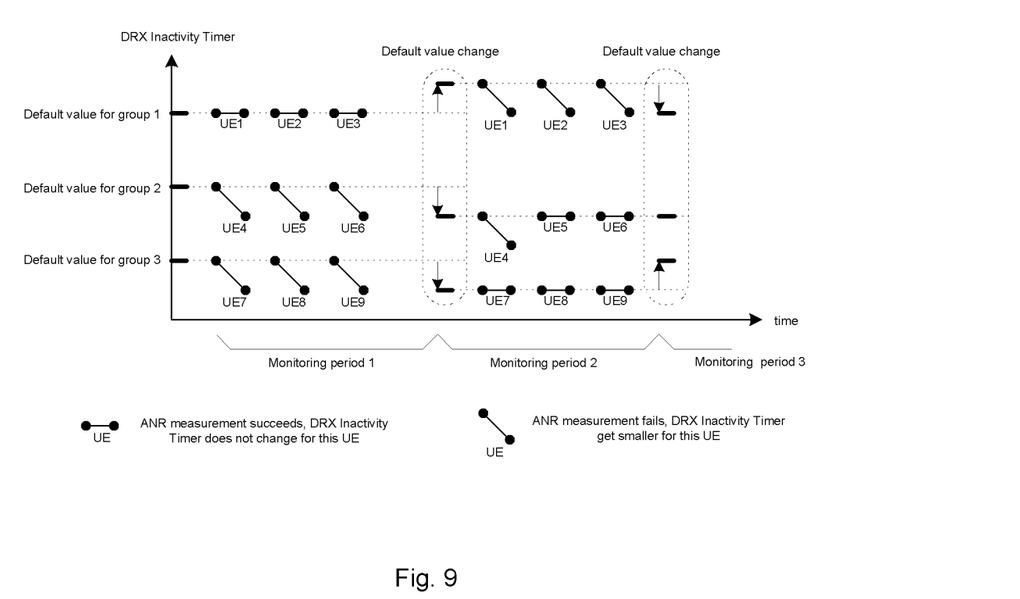
FIG. 9 is a diagram schematically illustrating the concurrent performance of the UE-group level adjustment and the UE level adjustment according to the present invention.

FIG. 9 shows an exemplified process in which the UE-group level adjustment and the UE level adjustment are concurrently performed to adjust the value of the DRX Inactivity Timer. As illustrated, three UE groups are considered in the process. Each group of UEs share the same default value of the DRX Inactivity Timer, and this default value might be adjusted at the end of the monitoring period for the UE-group level adjustment. Moreover, it is assumed that if the ANR measurement failure rate for a group of UE is larger than 50% for the current monitoring period, the default value of DRX Inactivity Timer for this group of UE will be reduced for the next monitoring period; if the ANR measurement failure rate is smaller than 5%, the default value of DRX Inactivity Timer will be increased. Concurrently, once a UE encounters an ANR measurement failure, its DRX Inactivity Timer is reduced to the next smaller enumerated value.

Without loss of generality, the process is observed for three monitoring periods. In monitoring period 1, all UEs in group 1 succeed in ANR measurement. The resulting ANR measurement failure rate is thus 0%, which is smaller than 5%. Accordingly, the default value of the DRX Inactivity Timer is increased for the next monitoring period (i.e. monitoring period 2). In monitoring period 1, all UEs in groups 2 and 3 fail to perform ANR measurement. The resulting ANR measurement failure rate is thus 100%, which is larger than 50%. Accordingly, the default values of the DRX Inactivity Timer are decreased for the monitoring period 2.

In monitoring period 2, all UEs in group 1 fail to perform ANR measurement. The resulting ANR measurement failure ratio is thus 100%. Accordingly, the default value of the DRX Inactivity Timer is decreased for the next monitoring period (i.e. monitoring period 3). In monitoring period 2, some UEs in group 2 fail to perform ANR measurement failure but others succeed. The resulting ANR measurement failure rate is 33.3%, which is larger than 5% but smaller than 50%. Accordingly, the default value of the DRX Inactivity Timer is maintained for the monitoring period 3. In monitoring period 2, all UEs in group 3 succeed in ANR measurement, and hence the default value of DRX Inactivity Timer is increased for the monitoring period 3.

As can be seen from the change of the DRX Inactivity Timer over time, the concurrent performance of the cell-level adjustment and the UE-level adjustment on one hand dynamically provides a steady DRX configuration generally suitable to most UEs in each group in the long term, and on the other hand timely provides an improved DRX configuration dedicatedly suitable to a single UE in the short term.

Besides the above factors taken into account to set and/or adjust the DRX parameter configuration, some other factors could be alternatively or additionally based on to set and/or adjust the DRX parameters. These factors can be divided into two categories. The first category is cell specific and semi-static, including e.g. the interference situation and the common configuration on power-related measurement (like RSRP/RSRQ thresholds). These factors are suitable to be applied in the above proposed UE-group level adjustment. The second category is UE specific and dynamic, including e.g. the UE's velocity and the UE's capability on ANR measurement. These factors are suitable to be applied in the above proposed UE level adjustment.

Taking a UE's velocity as an example, the higher the velocity is, the smaller value the DRX Inactivity Timer might take, so that more ANR measurement chance could be retained for a high speed UE as compared with a low speed UE.

Figure 10:
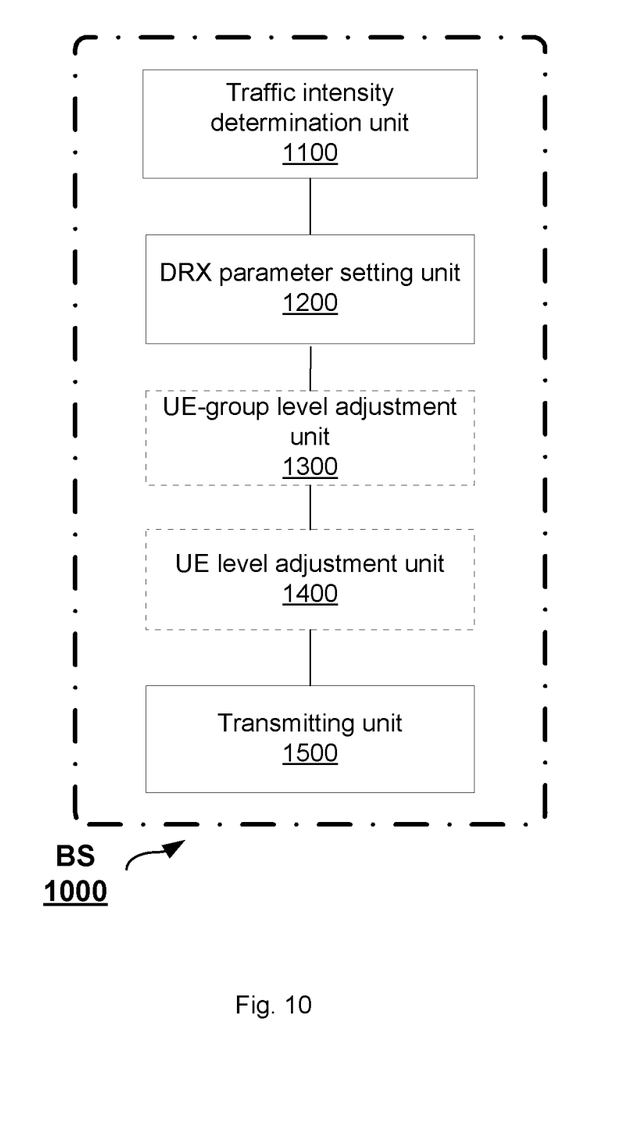
FIG. 10 is a block diagram schematically illustrating an example of a structure of a BS according to the present invention.

In the following, a structure of a BS 1000 involved in the DRX parameter configuration method according to the present invention will be given with reference to FIG. 10. As shown in FIG. 10, the BS 1000 according to the present invention may comprise a traffic intensity determination unit 1100, a DRX parameter setting unit 1200, a transmitting unit 1500.

In one implementation, the traffic intensity determination unit 1100 is configured to determine a traffic intensity of a UE by which a DRX-based ANR measurement is to be performed. The DRX parameter setting unit 1200 is configured to set a value for a DRX parameter to be used by the UE to perform the DRX-based ANR measurement, in accordance with the determined traffic intensity of the UE. The transmitting unit 1500 is configured to transmit the value set for the DRX parameter to the UE.

Preferably, the DRX parameter setting unit 1200 is configured to set a value for a DRX Inactivity Timer in accordance with the determined traffic intensity as well as a maximum acceptable ANR measurement failure rate.

Figure 11:
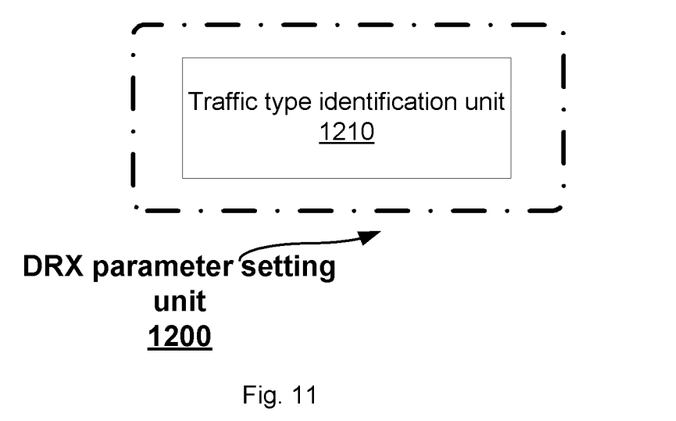
FIG. 11 is a block diagram schematically illustrating an example of a structure of a DRX parameter setting unit of the BS according to the present invention.

In another implementation, the DRX parameter setting unit 1200 may comprise a traffic type identification unit 1210 as illustrated in FIG. 11. In this case, the traffic type identification unit 1210 is configured to identify a traffic type of the UE, according to which range of a predetermined set of numerical ranges the traffic intensity of the UE falls into; and the DRX parameter setting unit 1200 is configured to set a value for the DRX parameter to be used by the UE to perform the DRX-based ANR measurement, in accordance with the traffic type identified by the traffic type identification unit.

Preferably, the DRX parameter setting unit is configured to set a value for a DRX Inactivity Timer in accordance with the identified traffic type as well as a maximum acceptable ANR measurement failure rate.

Figure 12:
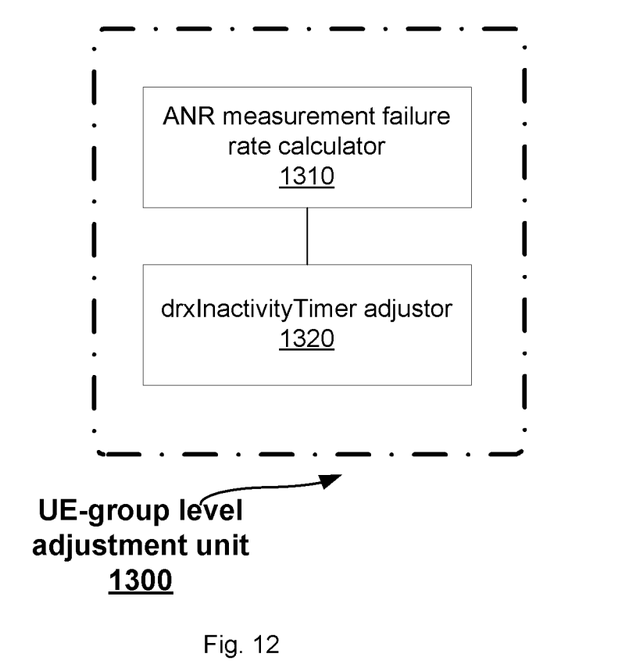
FIG. 12 is a block diagram schematically illustrating an example of a structure of a UE-group level adjustment unit of the BS according to the present invention.

Referring again to FIG. 10, the BS 1000 may further comprise a UE-group level adjustment unit 1300 and/or a UE level adjustment unit 1400. As shown in FIG. 12, the UE-group level adjustment unit 1300 may comprise an ANR measurement failure rate calculator 1310 and a DRX Inactivity Timer adjustor 1320. The ANR measurement failure rate calculator 1320 is configured to obtain an ANR measurement failure rate based on a number of ANR measurements performed by UEs of the identified traffic type in a cell and a number of failures of the ANR measurements, during a first monitoring period. The DRX Inactivity Timer adjustor is configured to reduce the DRX Inactivity Timer for the UEs of the identified traffic type after the first monitoring period, if the calculated ANR measurement failure rate is larger than a maximum acceptable ANR measurement failure rate or the maximum acceptable ANR measurement failure rate plus a first positive offset value; and increase the DRX Inactivity Timer for the UEs of the identified traffic type after the first monitoring period, if the calculated ANR measurement failure rate is smaller than the maximum acceptable ANR measurement failure rate or the maximum acceptable ANR measurement failure rate minus a second positive offset value. The UE level adjustment unit 1400 is configured to reduce the DRX Inactivity Timer for each UE after a second monitoring period if a number of ANR measurement failures the UE experiences during the second monitoring period exceeds a threshold. As will be appreciated by those skilled in the art, the structure of the BS 1000 as described above is illustrative rather than restrictive. For example, configured with a traffic type identification unit, a UE-group level adjustment unit, a transmitting unit and optionally a UE level adjustment unit, a BS is also capable of performing DRX parameter configuration to facilitate ANR measurement. Moreover, in case of the hardware implementation of the BS 100, the previously described units (i.e., the traffic intensity determination unit 1100, the DRX parameter setting unit 1200, the UE-group level adjustment unit 1300, the UE level adjustment unit 1400 and the transmitting unit 1500) can be either implemented as the same number of corresponding physical units or any number of physical units through functional combination or separation. For example, in a practical hardware implementation, the DRX parameter setting unit 1200 and the UE-group level adjustment unit 1300 may be implemented as a single physical unit for DRX parameter determination.

The present invention is described above with reference to the embodiments thereof. However, those embodiments are provided just for illustrative purpose, rather than limiting the present invention. The scope of the invention is defined by the attached claims as well as equivalents thereof. Those skilled in the art can make various alternations and modifications without departing from the scope of the invention, which all fall into the scope of the invention.

REFERENCES

[1] 3GPP specification TS36.300 v10.6.0
[2] 3GPP specification TS36.321 v10.4.0
[3] 3GPP specification TS36.133 v10.6.0

What is claimed is:

1. A Discontinuous Reception (DRX) parameter configuration method for facilitating Automatic Neighbor Relation (ANR) measurement, comprising:
   determining a traffic intensity of a User Equipment (UE) by which a DRX-based ANR measurement is to be performed;
   setting a value for a DRX parameter to be used by the UE to perform the DRX-based ANR measurement, in accordance with the determined traffic intensity of the UE and a maximum acceptable ANR measurement failure rate, wherein the DRX parameter pertains to a duration of DRX inactivity time; and
   transmitting the value set for the DRX parameter to the UE.

2. The method according to claim 1, wherein the DRX parameter is DRX Inactivity Timer.

3. The method according to claim 1, wherein the DRX parameter is set to one of a predetermined set of values, which is closest to but not larger than a value corresponding to the maximum acceptable ANR measurement failure rate in accordance with the determined traffic intensity.

4. The method according to claim 1, wherein setting the value for the DRX parameter further comprises:
   identifying a traffic type of the UE, according to which range of a predetermined set of numerical ranges the traffic intensity of the UE falls into; and
   setting the value for the DRX parameter to be used by the UE to perform the DRX-based ANR measurement, in accordance with the identified traffic type.

5. The method according to claim 4, wherein the DRX parameter is DRX Inactivity Timer, and the method further comprises an adjustment to the set value of the DRX Inactivity Timer, and the adjustment comprises:
   for a group of UEs having a same identified traffic type in a cell,
      obtaining an ANR measurement failure rate based on a number of ANR measurements performed by the UEs and a number of failures of the ANR measurements, during a first monitoring period;
      reducing the DRX Inactivity Timer for the UEs having the identified traffic type after the first monitoring period, if the obtained ANR measurement failure rate is larger than the maximum acceptable ANR measurement failure rate or the maximum acceptable ANR measurement failure rate plus a first positive offset value; and
      increasing the DRX Inactivity Timer for the UEs having the identified traffic type after the first monitoring period, if the obtained ANR measurement failure rate is smaller than the maximum acceptable ANR measurement failure rate or the maximum acceptable ANR measurement failure rate minus a second positive offset value.

6. The method according to claim 5, further comprising a UE level adjustment operation, comprising:
   for each UE,
      reducing the DRX Inactivity Timer for the UE after a second monitoring period, if a number of ANR measurement failures the UE experiences during the second monitoring period exceeds a threshold.

7. The method according to claim 6, wherein the first monitoring period is longer than the second monitoring period.

8. The method according to claim 1, wherein the traffic intensity of the UE is measured in terms of a data rate of the UE.

9. The method according to claim 6, wherein the DRX Inactivity Timer is further adjusted based on a UE-specific parameter.

10. The method according to claim 9, wherein the UE-specific parameter is a velocity of the UE; and wherein a higher the velocity is, a smaller value the DRX Inactivity Timer is adjusted to.

11. A Discontinuous Reception (DRX) parameter configuration method for facilitating Automatic Neighbor Relation (ANR) measurement, comprising:
    identifying a traffic type of a User Equipment (UE) by which a DRX-based ANR measurement is to be performed, according to which range of a predetermined set of numerical ranges a traffic intensity of the UE falls into;
    adjusting a DRX Inactivity Timer to be used by the UE to perform the DRX-based ANR measurement, by:
       for a group of UEs having a same identified traffic type in a cell,
          obtaining an ANR measurement failure rate based on a number of ANR measurements performed by the UEs and a number of failures of the ANR measurements, during a first monitoring period;
          reducing the DRX Inactivity Timer for the UEs having the identified traffic type after the first monitoring period, if the obtained ANR measurement failure rate is larger than a maximum acceptable ANR measurement failure rate or the maximum acceptable ANR measurement failure rate plus a first positive offset value; and
          increasing the DRX Inactivity Timer for the UEs having the identified traffic type after the first monitoring period, if the obtained ANR measurement failure rate is smaller than the maximum acceptable ANR measurement failure rate or the maximum acceptable ANR measurement failure rate minus a second positive offset value; and
    transmitting the adjusted DRX Inactivity Timer to the UE.

12. A base station (BS) adapted to perform Discontinuous Reception (DRX) parameter configuration to facilitate Automatic Neighbor Relation (ANR) measurement, comprising:

a processor; and memory containing program instructions, when executed by the processor, cause the BS to perform operations to:

determine a traffic intensity of a User Equipment (UE) by which a DRX-based ANR measurement is to be performed;

set a value for a DRX parameter to be used by the UE to perform the DRX-based ANR measurement, in accordance with the determined traffic intensity of the UE and a maximum acceptable ANR measurement failure rate, wherein the DRX parameter pertains to a duration of DRX inactivity time; and transmit the value set for the DRX parameter to the UE.

13. The BS according to claim 12, wherein the DRX parameter is DRX Inactivity Timer.

14. The BS according to claim 12, wherein the DRX parameter is set to one of a predetermined set of values, which is closest to but not larger than a value corresponding to the maximum acceptable ANR measurement failure rate in accordance with the determined traffic intensity.

15. The BS according to claim 12, wherein the program instructions, when executed by the processor, cause the BS to perform operations to identify a traffic type of the UE, according to which range of a predetermined set of numerical ranges the traffic intensity of the UE falls into; and to set the value for the DRX parameter to be used by the UE to perform the DRX-based ANR measurement, in accordance with the traffic type identified.

16. The BS according to claim 15, wherein the DRX parameter is DRX Inactivity Timer, and the BS further performs operations to:

obtain an ANR measurement failure rate based on a number of ANR measurements performed by a group of UEs having a same identified traffic type in a cell and a number of failures of the ANR measurements, during a first monitoring period;

reduce the DRX Inactivity Timer for the UEs having the identified traffic type after the first monitoring period, if the obtained ANR measurement failure rate is larger than the maximum acceptable ANR measurement failure rate or the maximum acceptable ANR measurement failure rate plus a first positive offset value; and increase the DRX Inactivity Timer for the UEs having the identified traffic type after the first monitoring period, if the obtained ANR measurement failure rate is smaller than the maximum acceptable ANR measurement failure rate or the maximum acceptable ANR measurement failure rate minus a second positive offset value.

17. The BS according to claim 12, wherein the traffic intensity of the UE is measured in terms of a data rate of the UE.

18. A BS adapted to perform Discontinuous Reception (DRX) parameter configuration to facilitate Automatic Neighbor Relation (ANR) measurement, comprising:

a processor; and memory containing program instructions when executed by the processor, cause the BS to perform operations to:

identify a traffic type of a User Equipment (UE) by which a DRX-based ANR measurement is to be performed, according to which range of a predetermined set of numerical ranges a traffic intensity of the UE falls into;

adjust a DRX Inactivity Timer to be used by the UE to perform the DRX-based ANR measurement by performing operations to:

obtain an ANR measurement failure rate based on a number of ANR measurements performed by a group of UEs having a same identified traffic type in a cell and a number of failures of the ANR measurements, during a first monitoring period;

reduce the DRX Inactivity Timer for the UEs having the identified traffic type after the first monitoring period, if the obtained ANR measurement failure rate is larger than a maximum acceptable ANR measurement failure rate or the maximum acceptable ANR measurement failure rate plus a first positive offset value; and increase the DRX Inactivity Timer for the UEs having the identified traffic type after the first monitoring period, if the obtained ANR measurement failure rate is smaller than the maximum acceptable ANR measurement failure rate or the maximum acceptable ANR measurement failure rate minus a second positive offset value; and transmit the adjusted DRX Inactivity Timer to the UE.

* * * * *